(12) United States Patent
Bart et al.

(10) Patent No.: US 9,264,442 B2
(45) Date of Patent: Feb. 16, 2016

(54) DETECTING ANOMALIES IN WORK PRACTICE DATA BY COMBINING MULTIPLE DOMAINS OF INFORMATION

(71) Applicant: Palo Alto Research Center Incorporated, Palo Alto, CA (US)

(72) Inventors: Evgeniy Bart, Sunnyvale, CA (US); Juan J. Liu, Milpitas, CA (US); Hoda M. A. Eldardiry, San Carlos, CA (US); Robert R. Price, Palo Alto, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 277 days.

(21) Appl. No.: 13/871,985

(22) Filed: Apr. 26, 2013

(65) Prior Publication Data
US 2014/0325643 A1    Oct. 30, 2014

(51) Int. Cl.
H04L 29/06    (2006.01)

(52) U.S. Cl.
CPC .................. *H04L 63/1425* (2013.01)

(58) Field of Classification Search
None
See application file for complete search history.

(56) References Cited

U.S. PATENT DOCUMENTS

| | | | | |
|---|---|---|---|---|
| 6,769,066 B1* | 7/2004 | Botros | ............. | G06F 21/55 700/110 |
| 7,017,186 B2* | 3/2006 | Day | ............. | 726/23 |
| 7,523,016 B1* | 4/2009 | Surdulescu | ............. | G06F 21/316 702/185 |
| 7,555,482 B2* | 6/2009 | Korkus | ............. | G06F 21/316 |
| 7,567,946 B2* | 7/2009 | Andreoli | ............. | G06K 9/6226 706/12 |
| 8,214,364 B2* | 7/2012 | Bigus | ............. | G06F 21/316 707/737 |
| 8,836,536 B2* | 9/2014 | Marwah | ............. | H04Q 9/00 340/870.01 |
| 8,903,756 B2* | 12/2014 | Zhao | ............. | G06N 5/043 706/55 |
| 8,966,036 B1* | 2/2015 | Asgekar et al. | ............. | 709/223 |
| 9,112,895 B1* | 8/2015 | Lin | ............. | H04L 63/1416 |
| 2004/0225627 A1* | 11/2004 | Botros | ............. | G06F 21/55 706/16 |
| 2006/0020814 A1* | 1/2006 | Lieblich et al. | ............. | 713/182 |
| 2006/0206445 A1* | 9/2006 | Andreoli | ............. | G06K 9/6226 706/52 |
| 2007/0094265 A1* | 4/2007 | Korkus | ............. | G06F 21/316 |
| 2007/0118909 A1* | 5/2007 | Hertzog et al. | ............. | 726/23 |
| 2007/0240207 A1* | 10/2007 | Belakhdar | ............. | G06F 21/316 726/12 |
| 2007/0294187 A1* | 12/2007 | Scherrer | ............. | H04L 63/1425 705/75 |
| 2008/0271143 A1* | 10/2008 | Stephens | ............. | H04L 41/5061 726/22 |
| 2009/0292743 A1* | 11/2009 | Bigus | ............. | G06F 21/552 |
| 2009/0293121 A1* | 11/2009 | Bigus | ............. | G06F 21/316 726/22 |
| 2010/0094767 A1* | 4/2010 | Miltonberger | ............. | G06Q 10/067 705/325 |

(Continued)

*Primary Examiner* — Andrew Nalven
*Assistant Examiner* — Christopher Ruprecht
(74) *Attorney, Agent, or Firm* — Shun Yao; Park, Vaughan, Fleming & Dowler LLP (57) ABSTRACT

One embodiment of the present invention provides a system for multi-domain clustering. During operation, the system collects domain data for at least two domains associated with users, wherein a domain is a source of data describing observable activities of a user. Next, the system estimates a probability distribution for a domain associated with the user. The system also estimates a probability distribution for a second domain associated with the user. Then, the system analyzes the domain data with a multi-domain probability model that includes variables for two or more domains to determine a probability distribution of each domain associated with the probability model and to assign users to clusters associated with user roles.

20 Claims, 5 Drawing Sheets

(56) References Cited

U.S. PATENT DOCUMENTS

| | | | |
|---|---|---|---|
| 2010/0125911 A1* | 5/2010 | Bhaskaran | G06Q 10/10 726/23 |
| 2011/0252032 A1* | 10/2011 | Fitzgerald et al. | 707/737 |
| 2011/0295783 A1* | 12/2011 | Zhao | G06F 17/30702 706/12 |
| 2012/0136676 A1* | 5/2012 | Goodall | G06Q 10/0635 705/2 |
| 2012/0137367 A1* | 5/2012 | Dupont | G06F 21/00 726/25 |
| 2012/0284791 A1* | 11/2012 | Miller | G06F 21/554 726/22 |
| 2013/0091539 A1* | 4/2013 | Khurana | G06F 21/552 726/1 |
| 2013/0198119 A1* | 8/2013 | Eberhardt, III | G06N 7/005 706/12 |
| 2014/0096249 A1* | 4/2014 | Dupont | G06F 21/00 726/23 |
| 2014/0165207 A1* | 6/2014 | Engel | H04L 63/1425 726/25 |

* cited by examiner

DETECTING ANOMALIES IN WORK PRACTICE DATA BY COMBINING MULTIPLE DOMAINS OF INFORMATION

STATEMENT OF GOVERNMENT-FUNDED RESEARCH

This invention was made with Government support under Contract No. W911NF-11-C-0216 awarded by Army Research Office. The Government has certain rights in this invention.

BACKGROUND

1. Field

This disclosure is generally related to detecting malicious insider activities. More specifically, this disclosure is related to a probability model for detecting malicious activity performed by insiders within an organization.

2. Related Art

Malicious insiders are an increasing threat to many organizations. People authorized to access internal information may disrupt the organization's operations or leak sensitive information to outside parties. As a result, collecting and monitoring work practice data within organizations is becoming prevalent. This work practice data includes many typical activities of PC users, such as logging on/off, accessing web sites, sending and receiving emails, and accessing external devices or files. Each activity is called a "domain" or a "modality." For example, domains may include logon domain and email domain. One may detect malicious intent within an organization before the malicious activity occurs by analyzing this data and detecting anomalies. Currently, this analysis is limited to a single domain at a time. Typically, one detects anomalies or outliers separately within each domain. Some approaches combine anomaly scores in an ad hoc manner (for example, by ignoring users who are outliers in only one domain). Users who are not outliers in any of the domains may never be labeled as outliers by these analysis methods.

SUMMARY

One embodiment of the present invention provides a system for multi-domain clustering. During operation, the system collects domain data for at least two domains associated with users, wherein a domain is a source of data describing observable activities of a user. Next, the system estimates a probability distribution for a domain associated with the user. The system also estimates a probability distribution for a second domain associated with the user. Then, the system analyzes the domain data with a multi-domain probability model that includes variables for two or more domains to determine a probability distribution of each domain associated with the probability model and to assign users to clusters associated with user roles.

In a variation on this embodiment, the domain data includes one or more of average number of e-mails, topical content of e-mail, average number of files, average number of HTTP access, addresses for HTTP access, and average number of logons.

In a variation on this embodiment, the system computes an anomaly score for the user for each of the domains, and computes an aggregate anomaly score for the user that includes weighted anomaly scores for each of the domains.

In a variation on this embodiment, the system clusters domain data for a first domain. The system then associates a first cluster index for the first domain with a particular user. Next, the system clusters domain data for a second domain. The system associates a second cluster index for the second domain with the particular user. The system then generates a discrete distribution for the particular user that includes the first cluster index and the second cluster index.

In a further variation, the system compares a user's cluster indices with other users' cluster indices to determine whether the user's activities are anomalous.

In a further variation, associating the first cluster index for the first domain with the particular user includes estimating a maximum a posteriori probability cluster index for the user. The system then associates the user with the maximum a posteriori probability cluster index.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of detecting anomalous insider activity by clustering users with a multi-domain probability model, and detecting anomalies by using the clustering information to compare a user's activities against activities of other users in similar roles. A domain is a source of user activity information. For example, a domain can be one of: device access, e-mail, file copy and/or access, Hypertext Transfer Protocol (HTTP) access, or logon activity. A malicious activity detection system may detect anomalous user activities by collecting user activity information from different domains, clustering the users based on the user activity information, and comparing a user's activities against other users with similar roles (also called peers). The clusters may correspond to user roles in organizational structures because different roles have different user activity patterns. A role is a person's job within an organization. For example, roles can include software engineers or lawyers.

A fundamental insight for detecting anomalous activity is that, within an organization, different user roles have different patterns for e-mailing, accessing files, etc. For example, a software engineer may access hundreds of source code and object files a day while compiling and testing a computer program. The software engineer may also send few internal e-mails daily. A lawyer may access only a few legal documents each day, and e-mail clients in other organizations often. These different roles have different e-mailing and file access patterns. The system can detect anomalous user activity by clustering users according to multiple domains, such as clustering by e-mail and file usage patterns, and then comparing a user to others with similar roles to detect anomalies.

The system described herein utilizes a multi-domain model (also called a global model) for the entire set of available domains, and finding outliers in that multi-domain model. There are two advantages to this modeling strategy. First, the system combines anomaly scores from multiple domains in a data-driven manner. Second, the strategy facilitates detection of anomalous behaviors that are not by themselves anomalous in a single domain.

The system may use the multi-domain probability model disclosed herein to cluster users. The multi-domain probability model facilitates inferring the probability distributions of domains associated with clusters and distribution of users among a number of clusters. A cluster of users is a group of users with domain characteristics that are within the probability distributions of the cluster. A domain characteristic is, for example, the number of e-mails a user sends daily. Another domain characteristic can be the number of files the user accesses daily. Each cluster includes users performing similar roles in an organization.

Each cluster is associated with a distribution for each domain. For example, each cluster can be associated with a distribution for the number of e-mails sent by users within that cluster, and a distribution for the number of files accessed by users within that cluster. To detect anomalous user activity, the system may compare a user to other users in the same role, and determine whether the user exhibits anomalous e-mail and file usage patterns.

To detect anomalous user activity, the system may also separately cluster users for each domain to associate single-domain cluster indices with each user, and then cluster the users according to the single-domain cluster indices. For example, the system may cluster users according to the average number of files accessed daily (or within any predetermined time period), and cluster users according to an average number of e-mails sent and received daily (or within any predetermined time period). The system associates each user with a single-domain cluster number for the e-mail domain, and associates each user with a single-domain cluster number for the file domain. The system then clusters the users according to the single-domain cluster numbers from the different domains, thereby generating a discrete distribution for each user. The system can then compare a user's distribution of single-domain clusters with others that have roles similar to the user to detect anomalies. Furthermore, the system can compute an anomaly score for each user for each domain, and then compute an aggregate anomaly score by weighting the separate anomaly scores for the domains.

The methods described herein utilize standard multivariate probability inference techniques to infer a joint probability distribution. A system applying the methods described herein can obtain domain data, and then use standard probability inference techniques with the disclosed probability model to determine the probability distributions of the cluster's domains, and the distribution of users among clusters. Domain data is data that describes user activity relating to a domain. The disclosed probability model is a generative model, and belongs to the general family of topic models. A topic model is a generative model for documents, and specifies a probability procedure by which one can generate documents (e.g., user and role data).

Note that one can perform a generative process associated with the disclosed probability model by sampling a cluster, and then sampling a user from the cluster. First, one samples a cluster with an associated index. The clusters correspond to users that have similar e-mail and file usage patterns. Each cluster has a set of parameters $\phi_r$ that determine the users that may be grouped together in the cluster, and the domain characteristics associated with these users. For example, a cluster may include software engineering types of users. Another cluster may include lawyer types. After sampling the cluster, one can sample a user from the parameters associated with the cluster. One can sample the number of files accessed or the number of e-mails sent.

The sections that follow discuss the probability model for multi-domain clustering, a technique for single-domain clustering with multi-domain analysis, a clustering process, and an example implementation of the malicious activity detection system. Note that although this disclosure provides examples using e-mail and file access domains, embodiments of the present invention are not limited to analyzing any particular domains.

System Architecture

Figure 1:
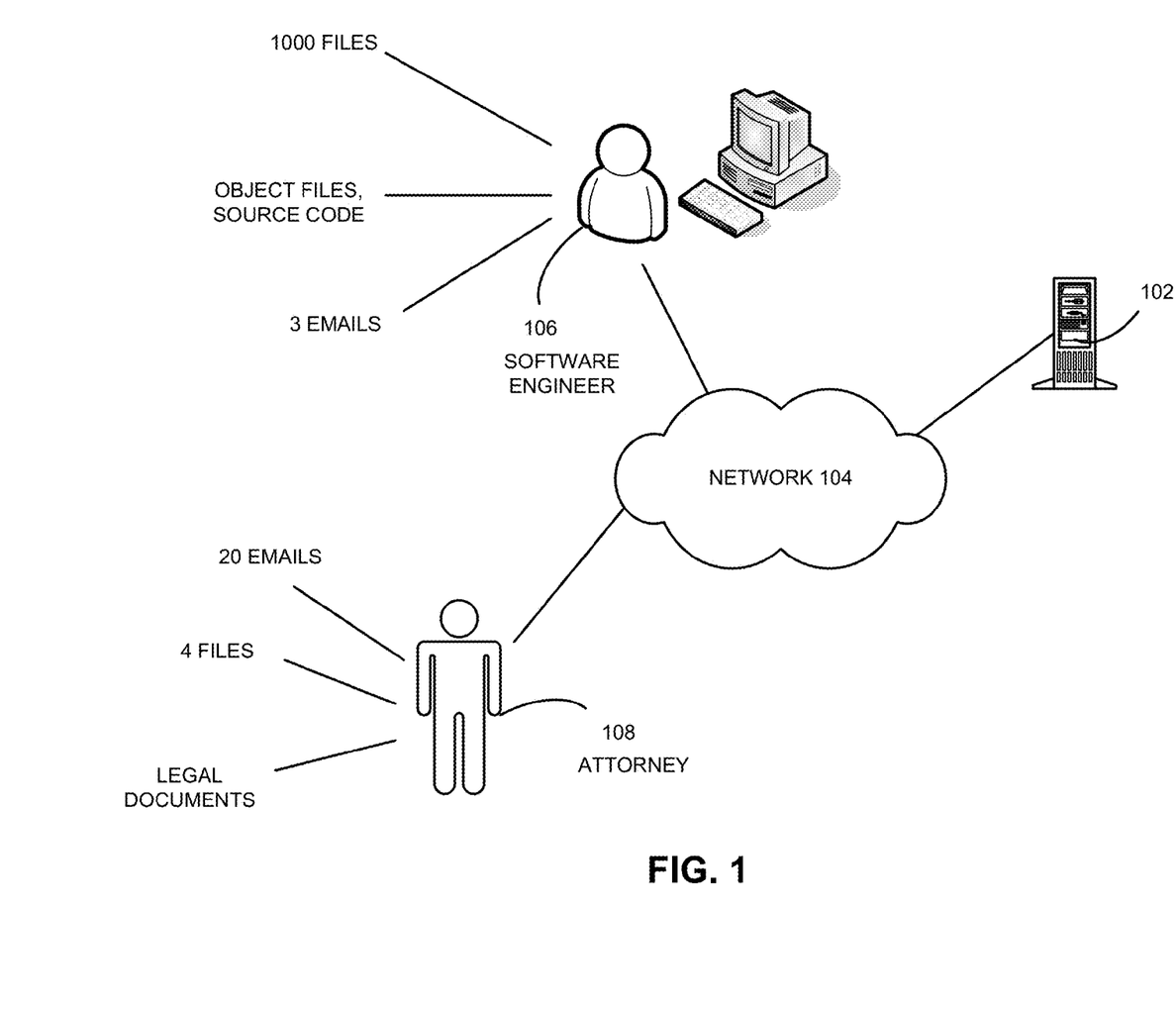
FIG. 1 presents a diagram illustrating a system for facilitating anomaly detection based on a multi-domain probability model, according to an embodiment.

FIG. 1 presents a diagram illustrating a system for facilitating anomaly detection based on a multi-domain probability model, according to an embodiment. In FIG. 1, a server 102 receives domain data over a network 104. The domain data describes user activities such as e-mails sent and received and files accessed. For example, the domain data may describe activities performed by a user 106 who has a role of software engineer. User 106 may access 1000 files a day that include object files and source code, and send three e-mails daily on average. As another example, the domain data may describe activities performed by a user 108 who has a role of attorney. User 108 may access four files a day that include legal documents and send 20 e-mails daily.

Various computers and/or other electronic equipment may collect data describing user activities such as the number of e-mails that a user sends and receives within a predetermined time period, the number of files accessed within the predetermined time period, the topical content of e-mails, the number of logons within the predetermined time period, the number and type of websites visited within the predetermined time period, number of HTTP accesses within the predetermined time period, addresses for HTTP access, number of logons within the predetermined time period, and the number of websites visited within the predetermined time period.

Domain data may also include the types of files that a user accesses. For example, a software engineer may access source code and object files, but a lawyer may access word processing documents. The system may analyze the topical distributions of documents, including e-mail. The system may also determine the statistics for collected data, such as computing the averages for all of the data collected. For example, the system may compute the average number of machines accessed daily for logon.

After receiving the event data, server 102 may cluster the user activity data. This involves determining probability distributions for domains associated with clusters, and also determining distribution of users among clusters.

After the system determines the distributions, the system may utilize the model to detect anomalous user behavior. The system and/or a human operator may compare a user with that of his peers to determine whether the user behaves similarly within the domains. Users are peers if they share a job role or position. If a user does not behave similarly to other peers within a domain, then that user behavior can be labeled as anomalous. If the user activity is unpredictable, the system may label the user as anomalous. For example, if a user sends or reads less than the typical number of e-mails that others in the same role would, the system may flag the user as anomalous.

Exemplary Probability Model

Figure 2:
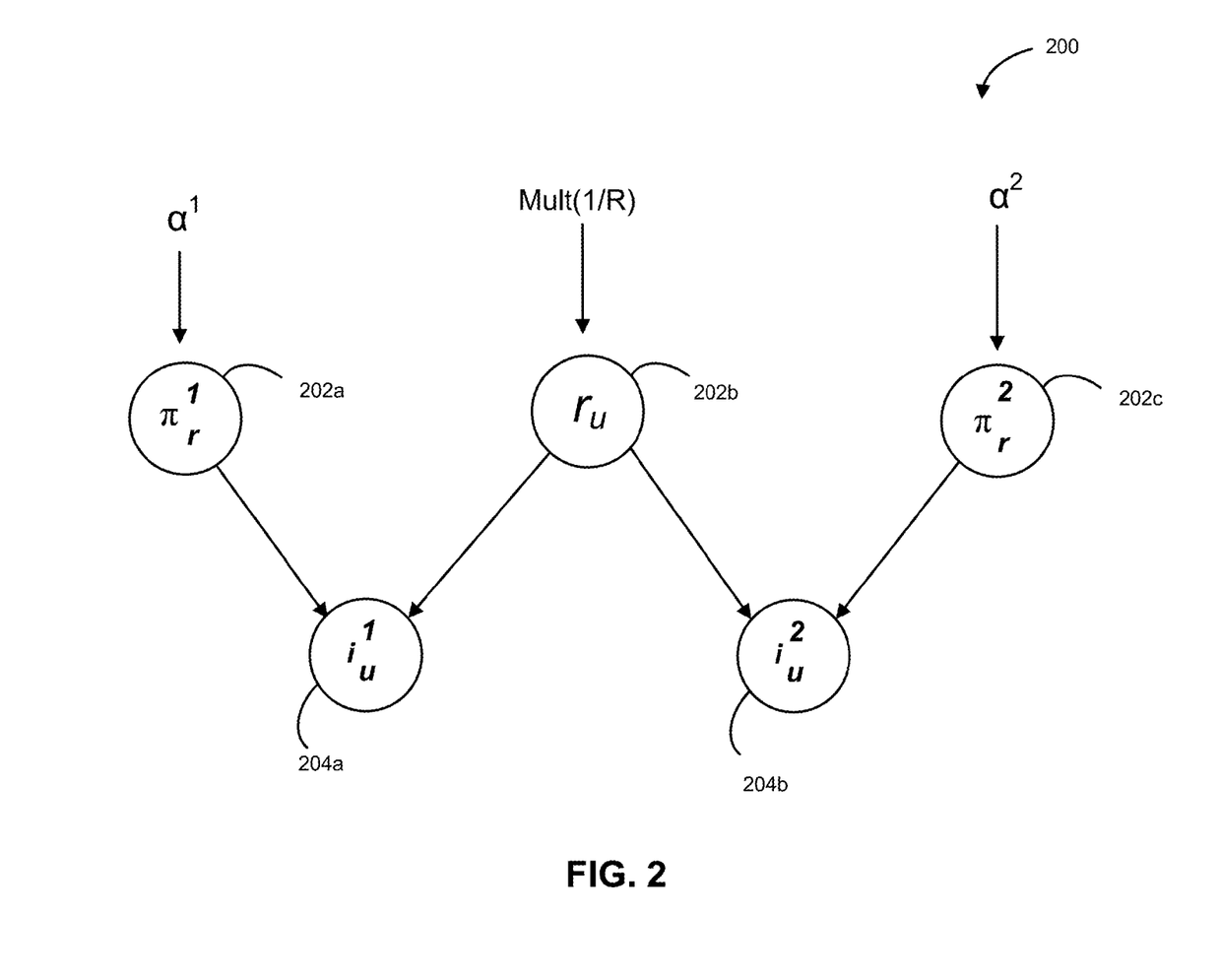
FIG. 2 presents a block diagram illustrating an exemplary probability model for multi-domain clustering, according to an embodiment.

FIG. 2 presents a block diagram illustrating an exemplary probability model for multi-domain clustering, according to an embodiment. The probability model depicted in FIG. 2 illustrates dependency structures between different variables of clusters. The arrows denote the dependency structure of the probability model. Note that one can remove or add dependencies and nodes to adapt the model to suit different sets of domains.

In FIG. 2, each node (e.g., circle) corresponds to a variable in the probability model. Nodes 202a, 202c are variables representing the distribution for domains associated with clusters. Node 202b represents the role of user u, and corresponds to a cluster associated with user u. The system receives domain data represented by nodes 204a, 204b. Then, based on the domain data received, the system determines the probability distributions of the latent variables represented by nodes 202a-202c. Similar to the dependencies, one can change or remove the nodes to adapt to different domains. R represents a number of total number of roles, and 1/R represents one of the job roles which is associated with the user. "Mult" indicates that this is a multi-domain probability models. Note that users can be associated with more than one role, since users can have multiple job titles and responsibilities in organizations.

In FIG. 2, $\alpha^1$ and $\alpha^2$ are hyperparameters. In Bayesian statistics, a hyperparameter is a parameter of a prior distribution. A prior distribution is a probability distribution that expresses one's uncertainty about a parameter or latent variable of a distribution. The prior distribution is typically a subjective assessment of an expert. In this diagram, $\alpha^1$ represents a parameter of a prior distribution for $\pi_r^1$ associated with a first domain, and $\alpha^2$ represents a parameter of a prior distribution for $\pi_r^2$ associated with a second domain. One can estimate the values of $\alpha^1$ and $\alpha^2$. For nodes 204a, 204b, $i_u^1$ and $i_u^2$ represent the observed data for a first domain and a second domain, respectively. One may also provide a hyperparameter (not pictured) and estimate a prior distribution for $r_u$, which represents the distribution of users among clusters that correspond to roles.

Exemplary Process

Figure 3:
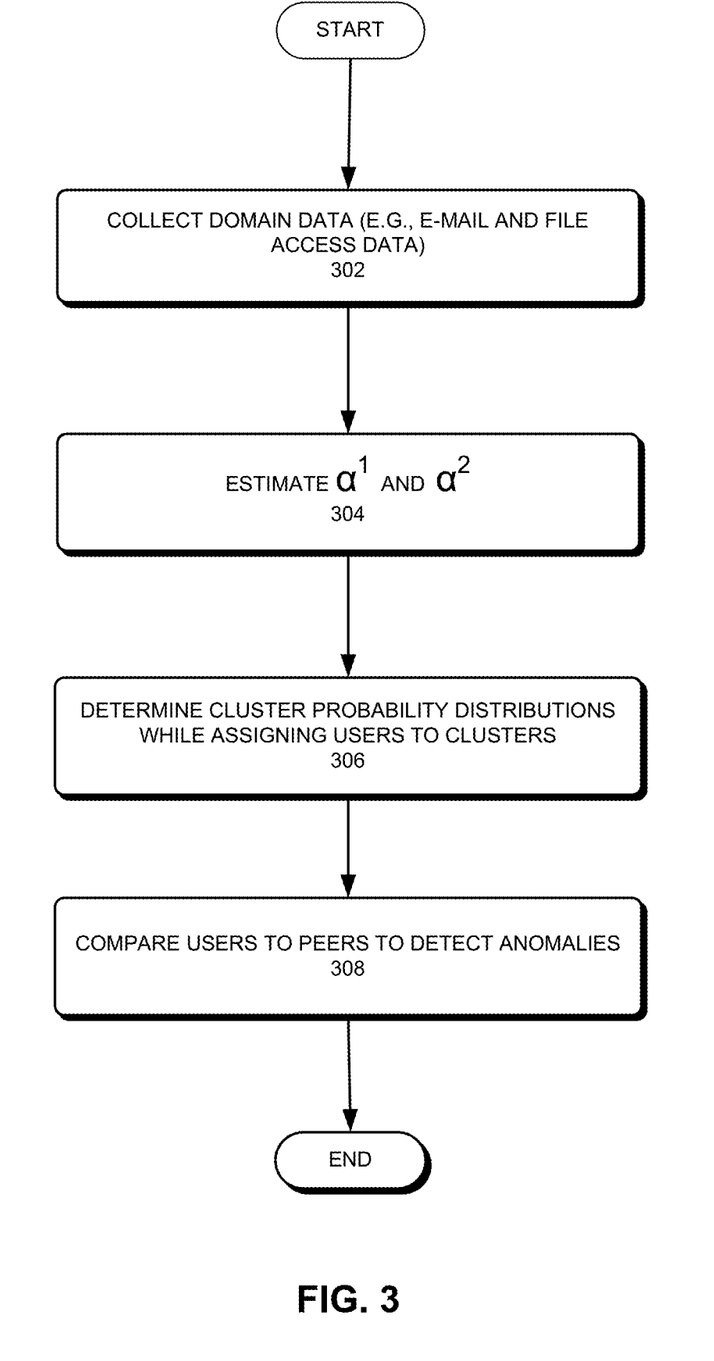
FIG. 3 presents a flowchart illustrating an exemplary process for detecting anomalies by clustering with a multi-domain probability model, according to an embodiment.

FIG. 3 presents a flowchart illustrating an exemplary process for detecting anomalies by clustering with a multi-domain probability model, according to an embodiment. During operation, the system initially collects domain data, such as a number of e-mails sent by users and a number of files accessed by the users (operation 302). The system may itself collect the user activity data or obtain the user activity data from computers with log records or from any machine or person that monitors and collect data on user activities. A computer operator may input the event data or the machines may automatically collect such user activity data. Next, the system obtains estimated $\alpha^1$ and $\alpha^2$ values as parameters for prior distributions of $\pi_r^1$ and $\pi_r^2$, respectively (operation 304).

The system may obtain both estimated values through input from a human operator. The system may also obtain estimated values from previously stored data or by generating the estimated values. The system then determines cluster probability distributions for $\pi_r^1$ and $\pi_r^2$ (operation 306). The system outputs a cluster index for each user and the probability distributions for each domain. The cluster index is associated with a role (e.g., lawyer, software engineer) for the user. The probability distributions for the domains characterize the role associated with each cluster. The system may also compute a single probability estimate for each user's data by comparing a user's data with the distributions and expected values of distributions for the clusters the user is associated with. The system may then compare users with peers to detect anomalies (operation 308).

The system may apply one of the standard techniques to determine the probability distributions of domains in clusters based on the domain data. These techniques include Gibbs sampling or variational inference. Gibbs sampling is a standard method for probability inference. Gibbs sampling is a Markov chain Monte Carlo (MCMC) algorithm for obtaining a sequence of observations from a multivariate probability distribution (e.g. from the joint probability distribution of two or more variables). The system may utilize this sequence to approximate the joint distributions. With variational inference, the system approximates the posterior distribution over a set of unobserved variables given some data (e.g., approximating the domain distributions after observing the domain evidence).

Note that embodiments of the present invention are not limited to utilizing Gibbs sampling or variational inference, and the system may also utilize other algorithms for inferring the probability distributions.

After determining the probability distributions of the clusters, the system may gauge the accuracy of the probability model. The system can generate fictitious users from the inferred probabilities, and compare the generated users to actual users to determine whether the model is accurate.

Estimating Multi-Domain Consistency

Figure 4:
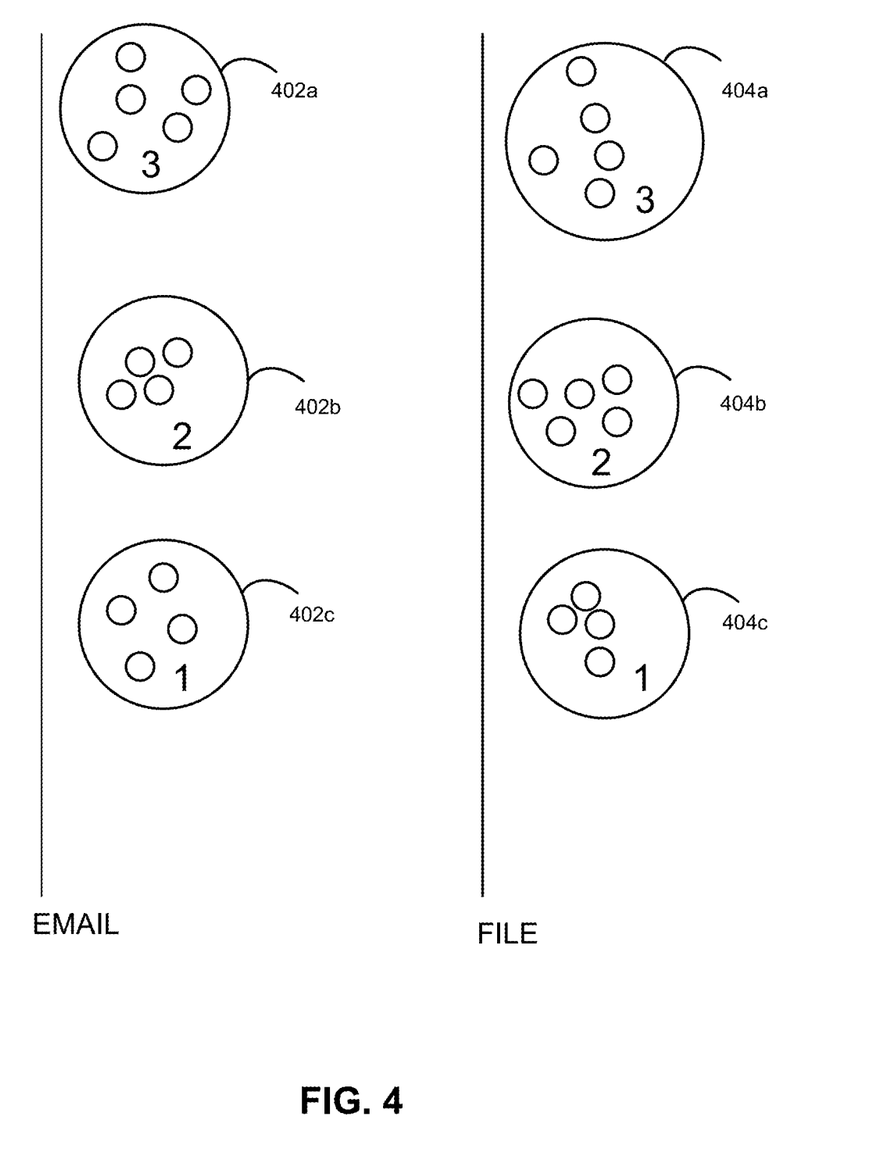
FIG. 4 presents a block diagram illustrating estimating multi-domain consistency, according to an embodiment.

FIG. 4 presents a block diagram illustrating estimating multi-domain consistency, according to an embodiment. In some embodiments, instead of directly clustering domain data, the system may perform clustering in two stages. In a first stage, the system pre-clusters domain data for individual domains to generate single-domain clusters. In a second stage, the system clusters the single-domain clusters so that users are associated with multi-domain clusters corresponding to roles. The system may then compare a user with his peers to determine whether the user's distribution of single-domain clusters is consistent with that of his peers. If the distribution of single-domain clusters is not consistent with the peers' distribution of single-domain clusters, the system may label the user's activities as anomalous.

FIG. 4 depicts two sets of single-domain clusters corresponding to two domains. The system may initially generate single-domain clusters from domain data using standard clustering techniques. For example, the system may apply k-means clustering to cluster the domain data. Note that k-means clustering is a technique for cluster analysis which partitions a number of observations into k clusters, where each observation belongs to the cluster with the nearest mean.

The system may label e-mail domain clusters 402a, 402b, and 402c with cluster indices 1, 2, and 3, respectively. The system may also label file domain clusters 404a, 404b, and 404c with cluster indices 1, 2, and 3, respectively. The system then associates each user with a cluster index in each domain. The system clusters the user's single-domain cluster indices with a multi-domain probability graph, such as probability graph 200 from FIG. 2. For this embodiment, nodes 204a, 204b represent the individual single-domain cluster indices. Nodes 202a, 202c represent the distribution of single-domain cluster indices across the different domains for each user.

The distributions $\pi_r^1$ and $\pi_r^2$ for nodes 202a, 202c are discrete distributions, since the values in the distributions indicate indices for the single-domain clusters that the users are associated with. Note that there may be tens or hundreds of domains in some implementations, and a user may have a single domain cluster index value associated with each of the domains. $\alpha^1$ and $\alpha^2$ represent parameters for prior distributions of $\pi_r^1$ and $\pi_r^2$, respectively. The system may apply one of the standard techniques to determine the probability distributions. The system may then analyze the distributions to detect anomalies. Variations of how a system may analyze distributions to detect anomalies are discussed further below.

The system may determine whether user activity is anomalous by attempting to predict a user's cluster index for one domain from the user's cluster indices for other domains. In one embodiment, the system may generate a cluster vector $c_u$, where $c_{ui}$ is a maximum a posteriori probability (MAP) cluster index for a user u in domain i. In Bayesian statistics, a MAP estimate is the mode of the posterior distribution. In the first stage, the system may determine MAP cluster indices for each user for each domain, and add the cluster indices to vector $c_u$.

For a user u, domain i is consistent if the domain's cluster index $c_{ui}$ is predictable from other cluster indices $\{c_{uj}\}_{j\neq i}$. In the simplest case, the system may use cluster indices of other users $w \neq u$ to learn a mapping from $\{c_{wj}\}_{j\neq i}$ to $c_{wi}$, and then determine whether this mapping generalizes to user u. With this technique, the system can determine whether domain i is consistent with the other domains for this user. If not, the system may label the user as an outlier. The system may determine an anomaly score based on overall prediction accuracy for domain i for other users. If the domain is difficult to predict in general, then the system should not penalize the incorrect predictions as severely. In contrast, for very predictable domains, the system may determine any incorrect predictions to be anomalous.

In an implementation, the system may utilize a leave-1-out technique to identify anomalous user activity. The system analyzes a specific user by fixing the domain values of all domains except for one. The basic principle is that normal individuals should be predictable. The system attempts to predict a cluster number of that domain. The system may identify the user activity as anomalous if the prediction is incorrect. For example, the system may set the domain values (e.g., cluster numbers) for a user such that logon=1, device=2, file=3, and e-mail=1. The system then attempts to predict a cluster number for the HTTP domain. If the prediction is incorrect, the system may label the user activity as anomalous.

In some embodiments, the system may compute an anomaly score for each domain, and then combine the anomaly scores. The system may combine anomaly scores across domains automatically, in a data-driven manner. As a result, the system may filter out discrepancies that are common in the data. For example, if (due to the volume of data), it is common for a user to be an outlier in at least one domain, then the system will not flag a user as anomalous overall if the user is anomalous in only one domain.

The system may compute anomaly scores for each domain and combine the anomaly scores by weighting the individual domains. The anomaly score for a domain d and user i is $$a(d, i) = m(d, i) * \log \frac{N}{\sum_j m(d, j)},$$

where N is the total number of users and j is each user j from j=1 to N. The system may adjust the prediction miss value m(d,i) for each domain d to reflect the weighted value of the domain. The system may then compute an aggregate anomaly score s(i) for user i as $s(i)=\Sigma_d a(d, i)$.

Exemplary System for Multi-Domain Clustering of Users

Figure 5:
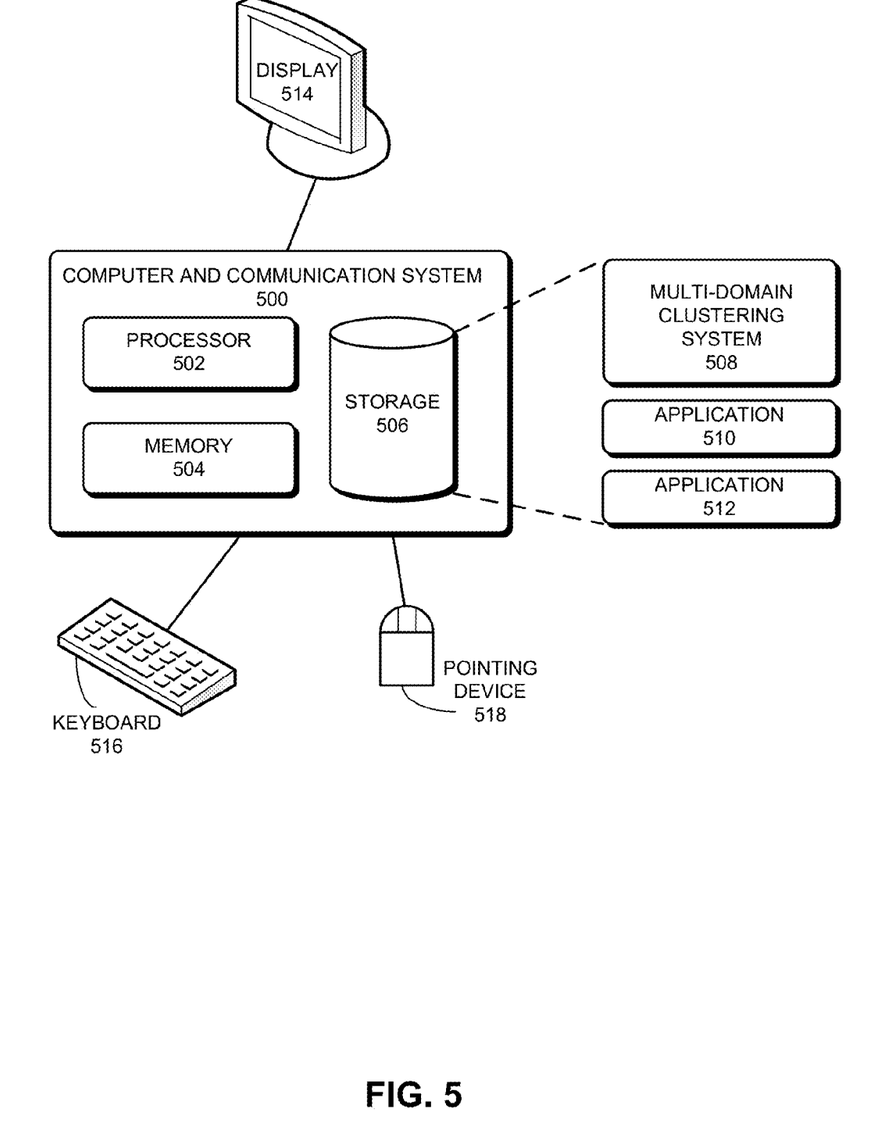
FIG. 5 illustrates an exemplary system for multi-domain clustering, in accordance with one embodiment of the present invention.

FIG. 5 illustrates an exemplary system for multi-domain clustering of users, in accordance with one embodiment of the present invention. In one embodiment, a computer and communication system 500 includes a processor 502, a memory 504, and a storage device 506. Storage device 506 stores a number of applications, such as applications 510 and 512. Storage device 506 also stores a multi-domain clustering system 508. During operation, one or more applications, such as multi-domain clustering system 508, are loaded from storage device 506 into memory 504 and then executed by processor 502. While executing the program, processor 502 performs the aforementioned functions. Computer and communication system 500 is coupled to an optional display 514, keyboard 516, and pointing device 518.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for multi-domain clustering, comprising:

receiving, by a computing device, from one or more computing devices over a network, domain data for at least two domains associated with users, wherein a domain is a source type describing observable activities of a plurality of users, and wherein a respective user is associated with a respective user role in an organization;

determining a hyperparameter value for a respective prior distribution of a probability distributing associated with a domain;

estimating a probability distribution for generating a multi-domain probability model;

generating a multi-domain probability model that includes variables for two or more domains, based on the hyperparameter value and the estimated probability distribution;

analyzing the domain data with the generated multi-domain probability model to assign a first user to a plurality of cluster indices associated with the first user's corresponding user role; and determining that an activity being performed by a second user is anomalous, based on a comparison between one or more of the second user's cluster indices to one or more of the first user's plurality of cluster indices.

2. The method of claim 1, wherein the domain data includes one or more of average number of e-mails, topical content of e-mail, average number of files, average number of HTTP access, addresses for HTTP access, and average number of logons.

3. The method of claim 1, further comprising:
computing an anomaly score for a respective user for each of the domains; and
computing an aggregate anomaly score for the respective user that includes weighted anomaly scores for each of the domains.

4. The method of claim 1, further comprising:
clustering domain data for a first domain;
associating a first cluster index for the first domain with a particular user;
clustering domain data for a second domain;
associating a second cluster index for the second domain with the particular user; and
generating a discrete distribution for the particular user that includes the first cluster index and the second cluster index.

5. The method of claim 4, further comprising comparing a user's cluster indices with other users' cluster indices to determine whether the user's activities are anomalous.

6. The method of claim 4, wherein associating the first cluster index for the first domain with the particular user comprises:
estimating a maximum a posteriori probability cluster index for the user; and
associating the user with the maximum a posteriori probability cluster index.

7. The method of claim 1, wherein determining that the activity being performed by the second user is anomalous comprises:
generating a discrete distribution for the second user that assigns the second user to a plurality of cluster indices; and
comparing the plurality of cluster indices for the second user with the plurality of cluster indices associated with the first user.

8. A non-transitory computer-readable storage medium storing instructions that when executed by a computer cause the computer to perform a method for multi-domain clustering, the method comprising:
receiving, by a computing device, from one or more computing devices over a network, domain data for at least two domains associated with users, wherein a domain is a source type describing observable activities of a plurality of users, and wherein a respective user is associated with a respective user role in an organization;

determining a hyperparameter value for a respective prior distribution of a probability distribution associated with a domain;

estimating a probability distribution for generating a multi-domain probability model;

generating a multi-domain probability model that includes variables for two or more domains, based on the hyperparameter value and the estimated probability distribution;

analyzing the domain data with the generated multi-domain probability model to assign a first user to a plurality of cluster indices associated with the first user's corresponding user role; and determining that an activity being performed by a second user is anomalous, based on a comparison between one or more of the second user's cluster indices to one or more of the first user's plurality of cluster indices.

9. The non-transitory computer-readable storage medium of claim 8, wherein the domain data includes one or more of average number of e-mails, topical content of e-mail, average number of files, average number of HTTP access, addresses for HTTP access, and average number of logons.

10. The non-transitory computer-readable storage medium of claim 8, wherein the computer-readable storage medium stores additional instructions that, when executed, cause the computer to perform additional steps comprising:
computing an anomaly score for a respective user for each of the domains; and
computing an aggregate anomaly score for the respective user that includes weighted anomaly scores for each of the domains.

11. The non-transitory computer-readable storage medium of claim 8, wherein the computer-readable storage medium stores additional instructions that, when executed, cause the computer to perform additional steps comprising:
clustering domain data for a first domain;
associating a first cluster index for the first domain with a particular user;
clustering domain data for a second domain;
associating a second cluster index for the second domain with the particular user; and
generating a discrete distribution for the particular user that includes the first cluster index and the second cluster index.

12. The non-transitory computer-readable storage medium of claim 11, further comprising comparing a user's cluster indices with other users' cluster indices to determine whether the user's activities are anomalous.

13. The non-transitory computer-readable storage medium of claim 11, wherein associating the first cluster index for the first domain with the particular user comprises:
estimating a maximum a posteriori probability cluster index for the user; and
associating the user with the maximum a posteriori probability cluster index.

14. A computing system for multi-domain clustering, the system comprising:
one or more processors,
a computer-readable medium coupled to the one or more processors having instructions stored thereon that, when executed by the one or more processors, cause the one or more processors to perform operations comprising:
receiving, by a computing device, from one or more computing devices over a network, domain data for at least two domains associated with users, wherein a domain is a source type describing observable activities of a plurality of users, and wherein a respective user is associated with a respective user role in an organization;

determining a hyperparameter value for a respective prior distribution of a probability distribution associated with a domain;

estimating a probability distribution for generating a multi-domain probability model;

generating a multi-domain probability model that includes variables for two or more domains, based on the hyperparameter value and the estimated probability distribution;

analyzing the domain data with the generated multi-domain probability model to assign a first user to a plurality of cluster indices associated with the first user's corresponding user role; and determining that an activity being performed by a second user is anomalous, based on a comparison between one or more of the second user's cluster indices to one or more of the first user's plurality of cluster indices.

15. The computing system claim 14, wherein the domain data includes one or more of average number of e-mails, topical content of e-mail, average number of files, average number of HTTP access, addresses for HTTP access, and average number of logons.

16. The computing system of claim 14, wherein the computing system stores additional instructions that, when executed, cause the computer to perform additional steps comprising:
    computing an anomaly score for a respective user for each of the domains; and
    computing an aggregate anomaly score for the respective user that includes weighted anomaly scores for each of the domains.

17. The computing system of claim 14, wherein the computing system stores additional instructions that, when executed, cause the computer to perform additional steps comprising:
    clustering domain data for a first domain;
    associating a first cluster index for the first domain with a particular user;
    clustering domain data for a second domain;
    associating a second cluster index for the second domain with the particular user;
    generating a discrete distribution for the particular user that includes the first cluster index and the second cluster index.

18. The computing system of claim 17, wherein the computing system stores additional instructions that, when executed, cause the computer to perform additional steps comprising:
    comparing a user's cluster indices with other users' cluster indices to
    determine whether the user's activities are anomalous.

19. The computing system of claim 17, wherein associating the first cluster index for the first domain with the particular user comprises:
    estimating a maximum a posteriori probability cluster index for the user; and
    associating the user with the maximum a posteriori probability cluster index.

20. The computing system of claim 14, wherein determining that the activity being performed by the second user is anomalous comprises:
    generating a discrete distribution for the second user that assigns the second user to a plurality of cluster indices; and
    comparing the plurality of cluster indices for the second user with the plurality of cluster indices associated with the first user.

* * * * *